E. MURRAINE.
HORSESHOE.

No. 178,871.  Patented June 20, 1876.

WITNESSES:
Julius Wilcke

INVENTOR:
Edward Murraine
By Gidley & Sherburne
Attys

UNITED STATES PATENT OFFICE.

EDWARD MURRAINE, OF ROCHELLE, ILLINOIS.

IMPROVEMENT IN HORSESHOES.

Specification forming part of Letters Patent No. 178,871, dated June 20, 1876; application filed March 29, 1876.

*To all whom it may concern:*

Be it known that I, EDWARD MURRAINE, of Rochelle, in the county of Ogle and State of Illinois, have invented certain new and useful Improvements in Horseshoes; and I do hereby declare the following to be a full, clear, and exact description thereof, which will enable others skilled in the art to which it appertains to make and use the same, reference being had to the accompanying drawing, forming part of this specification, in which—

Figure 1:
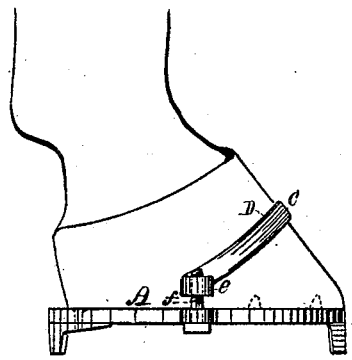
Figure 2:
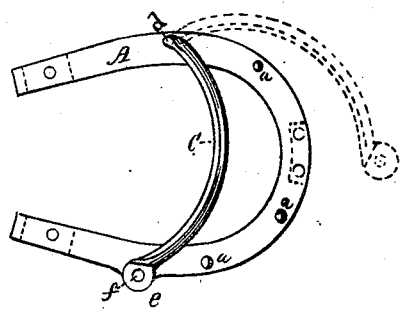
Figure 3:
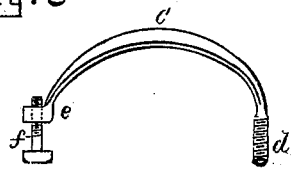

Figure 1 represents a side elevation of a horseshoe embodying my invention, showing the manner of securing it to the hoof of the horse. Fig. 2 represents a general plan or top view of the same detached, and Fig. 3 represents a side elevation of the clasp employed in securing the shoe to the hoof.

Like letters of reference indicate like parts.

The object of my invention is to provide a means of securing the shoe to the hoof of the horse without the use of nails, whereby the same may be readily attached or removed at will; and my invention consists in the combination, with the shoe provided with pointed pins adapted to enter the lower surface of the hoof, of a clasp adjusted to encircle the front portion of the hoof and secured to the shoe by screw-bolts, as will be hereinafter more fully described.

In the drawing, A represents the shoe, which is made in the usual shape and provided on its upper surface with a series of pointed pins, $a$, adapted to enter the lower surface of the hoof, as shown by dotted lines in Fig. 1. C is a wrought-metal clasp, curved in proper shape to fit around the front portion of the hoof, as shown at D. One end of this clasp is made round and screw-threaded externally, as shown at $d$, Fig. 3, by which means it is connected to the shoe by being screwed into an aperture formed therein, at a point about midway between the toe and the heel, and at the opposite end with an eye, $e$, adapted to receive a screw-bolt, $f$, passing upward through the shoe, as shown in Fig. 1. The arrangement of this clasp and its mode of attachment to the shoe are such as to hold the shoe firmly to the hoof by tightening the bolt $f$, or, by unscrewing the bolt, allow the shoe to be readily removed.

The shoe proper may be made of wrought or malleable iron, as may be preferred, and the toe and heel calks of steel, formed in such shape as to admit of being riveted to the shoe.

Having thus described my invention, what I claim as new, and desire to secure by Letters Patent, is—

The combination, with a horseshoe provided with pointed pins, adapted to enter the lower surface of the hoof, of the clasp C, adjusted to encircle the front of the hoof, and secured at one end to the shoe, by being screwed therein, and at the other end by the bolt $f$, substantially as specified.

The above specification of my invention signed by me this 21st day of March, 1876.

EDWARD MURRAINE.

Witnesses:
 N. C. GRIDLEY,
 N. H. SHERBURNE.